Aug. 19, 1969     P. I. HIRSCH     3,461,512
LOCKING DEVICE
Filed April 4, 1967
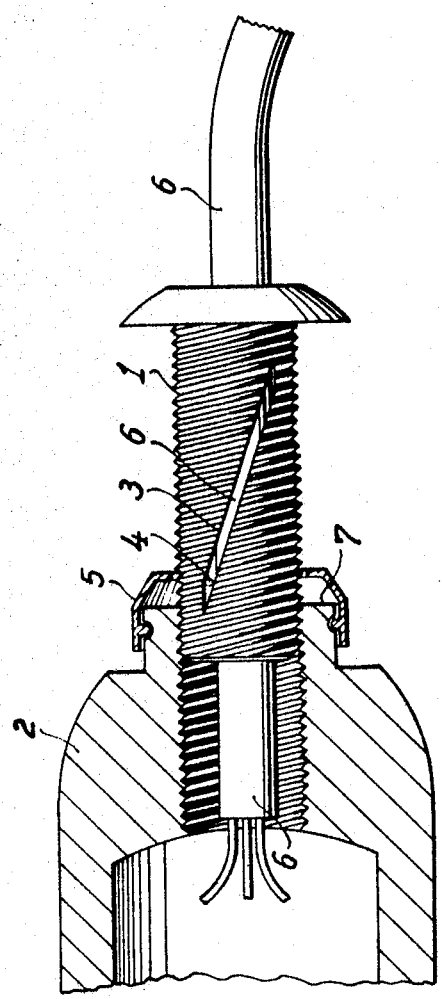
Inventor
Paul Hirsch
By Cushman, Darby & Cushman
Attorney United States Patent Office 3,461,512
Patented Aug. 19, 1969

3,461,512
LOCKING DEVICE
Paul I. Hirsch, Heuberggasse 9, Vienna 1170, Austria
Filed Apr. 4, 1967, Ser. No. 628,326
Int. Cl. H01r 13/58
U.S. Cl. 24—126          4 Claims

ABSTRACT OF THE DISCLOSURE

A device for locking an element into position with a hollow threaded member through which the element is passed and which has two parallel slots making an acute angle with the axis of the hollow member, a locking pin movable in the slots against the element to hold it in position and a nut means movable along the threaded member to force the locking pin to move in the slots and locks the element into position. Also disclosed are detent means associated with the nut by which the locking pin is retained in position after the nut is removed.

---

The invention relates to a device for the convenient and quick relieving and locking in position of cords, cables or flexes; for example of electric flexes at the outlet of an apparatus such as household appliance, where e.g. two or three conductors of a cable or flex are to be retained.

The locking devices hitherto known require either the formation of knots in, or the use of strips for tightening of the cord or cable which as a rule are accessible only from the interior of the apparatus.

The present invention relates to a device for the relief of the tensile loading of the cord, cable or flex which is accessible from outside.

The device according to the invention comprises substantially a hollow screw member 1, through which a cord or flex to be locked is passed, the screw member being engaged in a nut 2, two parallel lateral slots 3 being provided in the screw member, which include opposite helical pitch angles with the axis of the screw and each of which allows a loose transverse locking pin to slide therein. This locking pin passes through the said slots, and the sliding motion thereof is attained by retaining the locking pin as soon as the screw penetrates more deeply into the nut, which tends to reduce the distance spacing the locking pin from the outer ends of the said slots. The said cord or flex is thereby arrested between the said locking pin and the internal wall surface of the screw member, the arresting depending on the force by which the hollow screw member is tightened on the nut.

In order that the invention may be better understood, an embodiment of the invention will be described by way of example with reference to the accompanying drawing, which is a longitudinal section.

According to the embodiment of the invention as shown in the drawing, the device consists substantially in a hollow screw member 1, which engages in a nut 2. The hollow screw member 1 has two parallel lateral slots 3 which include opposite helical pitch angles with the axis thereof and which allow the passage of a loose transverse locking pin 4 through the slots 3 of the screw member.

A retaining cap 5 is also provided, in order to retain the locking pin 4 when unscrewing the screw member 1.

When using the device, the screw member 1 is sufficiently unscrewed from the nut 2 for the locking pin 4 to be positioned at one end of the slots 3 (which position is indicated in the drawing), a cord or flex 6 being inserted into the hollow screw member 1. As soon as the screw member 1 is tightened in the nut 2, the locking pin 4 abuts the end face 6 of the nut. When the tightening of the screw member 1 proceeds, the locking pin 4 slides in the slots 3 and approaches the outer ends of the said slots. As soon as the screw member 1 is sufficiently engaged in the nut 2, the locking pin 4, which is retained by the face 6 of the nut 2, contacts the cord or flex 6, whereby the same is pressed against the inner wall surface of the screw member 1. The pressure depends from this moment onwards on the force with which the screw is turned.

Similar devices may be used for adapting and locking electrical conductors and flexes.

A device, which allows the connection of two cords, may consist in a tube carrying two nuts, preferably with opposite screw threads and a hollow screw member with slotted ends for the charging. The clamping of the two cords is carried out by screwing both screw members into the tube.

The invention has been disclosed herein above by way of example but it is evident that numerous modifications may be made without departing from the scope of this invention.

What I claim is:
1. A device for relieving tensile stresses in cords, cables or flexes comprising a hollow screw member through which is passed the cord, cable or flex to be fixed and which engages in a nut, two parallel lateral slots being provided in the said screw member which include opposite helical pitch angles with the axis of the said screw member and which allow the sliding of a loose transverse locking pin passing through these slots, this sliding being effected by retaining the said locking pin as soon as the said screw member is more deeply engaged in the said nut and being capable of reducing the distance of these locking pins from one end of the said slots, the cord, cable or flex being arrested in such a manner between the said locking pin and the internal wall surface of the said screw member, that the extent of arresting depends from this moment on the force at which the said hollow screw member is tightened.

2. A device according to claim 1, wherein on the screw member a detent means is provided by which the said locking means is arrested when unscrewing the said hollow screw member.

3. A device for locking an element into position comprising:
   a hollow threaded member through with said element is passed having two parallel lateral slots making an acute angle with the axis of said hollow member;
   a locking pin having a portion passing through each of said slots and slidable in said slots; and
   nut means movable along the exterior of said threaded member and engagable with said locking pin so as to cause said locking pin to slide in said slots and lock said element into position.

4. A device as in claim 3 including detent means associated with said nut means by which said locking pin is retained in position locking said element when said nut means is moved away from said locking pin.

References Cited

UNITED STATES PATENTS

| | | | |
|---|---|---|---|
| 1,718,200 | 6/1929 | Baumann | 279—30 |
| 2,539,333 | 1/1951 | Silbermann. | |
| 2,650,118 | 8/1953 | Ripley | 287—114 |
| 3,361,460 | 1/1968 | Jansen | 279—59 X |

BERNARD A. GELAK, Primary Examiner

U.S. Cl. X.R.
339—1033, 270